United States Patent [19]

Dauphin et al.

[11] 4,413,337
[45] Nov. 1, 1983

[54] TIME DIVISION SWITCHING SYSTEM FOR CIRCUIT MODE AND PACKET MODE LINES

[76] Inventors: Jean-Louis Dauphin, 70, Résidence Corlay; Olivier F. Louvet, 22, av. de Bormandie Keruhel; Jean-Marc Pitie, 6, Résidence Corlay, all of Lannion, France, 22300

[21] Appl. No.: 231,936

[22] Filed: Feb. 4, 1981

[30] Foreign Application Priority Data

Feb. 13, 1980 [FR] France .............................. 80 03181

[51] Int. Cl.³ .............................................. H04J 3/04
[52] U.S. Cl. ........................................ 370/58; 370/94
[58] Field of Search ............................. 370/58, 60, 94

[56] References Cited

U.S. PATENT DOCUMENTS

3,988,545  10/1976  Kuemmerle et al. .................. 370/99

OTHER PUBLICATIONS

Hideo Miyahara et al.. "Flexible Multiplexing Technique with two Types of Packet for Circuit and Packet Switched Traffic" Jun. 1981 the Transaction of IECE of Japan pp. 390–397.
Arozullah "Evaluation of Three Processor Architecture for A Sattelitel Packet Switch" ICC '80 1980 International Conference on Communication Seattle, WA USA (8–12 Jun. 1980).
Sanders "Pacuit Switching Combines Two Techniques in One Network" Computer Design vol. 15, No. 6 pp. 83–88 Jun. 1976.

*Primary Examiner*—Benedict V. Safourek
*Assistant Examiner*—Stephen Chin
*Attorney, Agent, or Firm*—Lowe, King, Price & Becker

[57] ABSTRACT

The system switches first lines, each having a circuit mode channel and a packet mode channel, second circuit mode lines and third and fourth packet mode lines. The first lines are connected to subscriber equipments, each of which convoys both multiplexed channels which have a rate equal to that of the other lines. The second and third lines are connected to outside switching networks while the fourth lines are connected to a packet switching network. The number of the fourth lines is less than the sum of numbers of first and third lines. The fourth lines convey packets for all the connections established between two first lines or between a first line and a third line, or between a first line and the packet transmission medium served by the switching network. The system distinguishes the circuit mode channel and the packet mode channel in a first line. Switching is controlled either in response to the detection of the absence of flags in the incoming packet mode channel of a first line or in an incoming third line, or from switching network for a link from this network from a first or third line.

11 Claims, 4 Drawing Figures

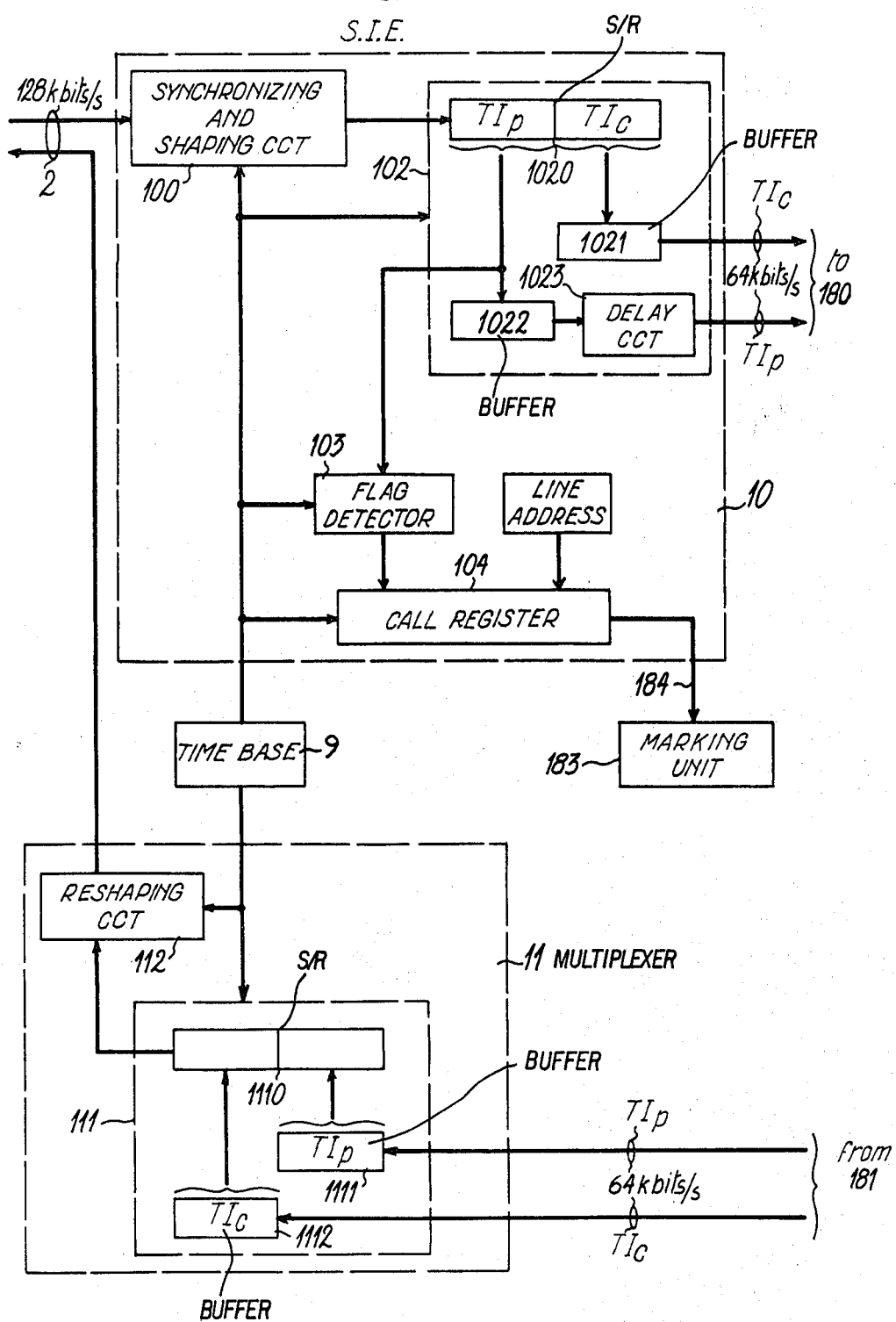

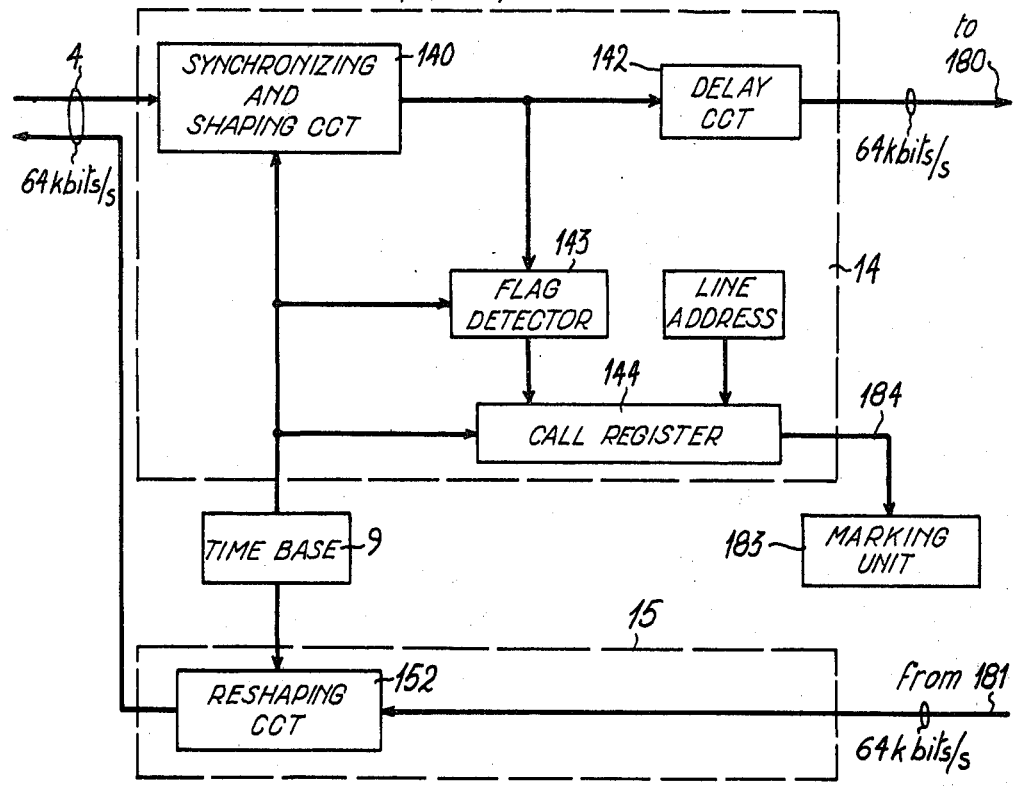
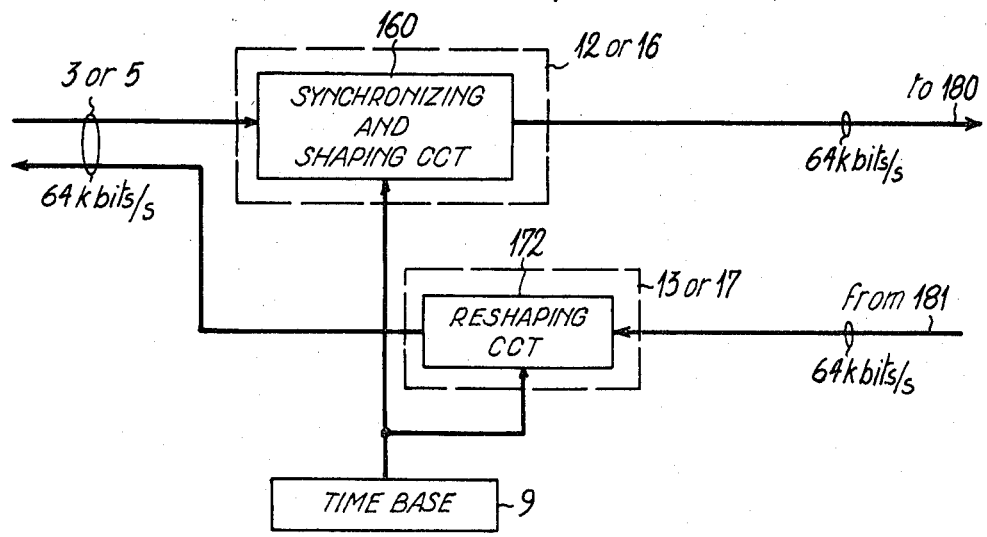

TIME DIVISION SWITCHING SYSTEM FOR CIRCUIT MODE AND PACKET MODE LINES

BACKGROUND OF THE INVENTION

1. Field of the Invention

This invention relates to a time division switching system for switching first bidirectional lines, each of which conveys a PCM circuit mode channel and a packet mode channel, with PCM circuit mode digital lines and packet mode digital lines.

2. Description of the Prior Art

System of this type are already known in the prior art wherein the first digital lines conveying both PCM coded speech and data packets are digital subscriber lines.

In the system described in French Patent Application No. 2,412,994, a bifilar subscriber line is interconnected between two items of multiplexing and demultiplexing equipment. At the subscriber end, the corresponding equipment is linked to a plurality of packetized data terminals, such as telecopiers and a teleprinter, as well as a telephone set via an analog-to-digital converter. At the other end of the subscriber line, the second multiplexing and demultiplexing equipment is bidirectionally connected, on the one hand, to a packet switching exchange via a link conveying the packet mode channels and, on the other hand, to a conventional telephone exchange, particularly digital, via a link conveying solely speech. Typically, a subscriber line conveys a channel ascribed to speech and two channels ascribed to data packets which are multiplexed, and transmission occurs in two-way alternate mode.

The major drawback of such a system is that the packet switching network must have a number of data terminal equipments (D.T.E.) equal to the number of subscriber lines or equal to the product of this number multiplied by the number of multiplexed packet mode channels in a subscriber line. In view of the fact that the true occupation of such packet mode channels is relatively low for a subscriber, it turns out that the cost of connecting a subscriber line to such a system is high due to the bijective assignment of D.T.E. items with respect to the packet mode channels.

Furthermore, the system according to French Patent Application No. 2,412,944 completely separates the packet switching and the digital voice switching. This implies that the data switching exchange is situated in the same place as the conventional telephone exchange. In fact, considering the forseeably restricted number of subscribers having data terminal equipment, the packet switching network is generally moved away from the subscriber-related telephone exchange, the latter then having to receive the packets along a digital trunk via the switching network so as to cut down on the substructure outlay of connecting subscribers to the packetized transmission media.

OBJECTS OF THE INVENTION

The principal object of this invention is to provide a digital switching system wherein the circuit mode switching, i.e. of the digital voice channels, as well as the packet switching, i.e. of the packet mode channels, is performed via a subscriber-related conventional digital switching network, providing a few internal modifications thereto are made.

SUMMARY OF THE INVENTION

According to this object, a time division digital system, while in a first state, switches first PCM circuit mode digital channels, each of which is multiplexed with a second packet mode digital channel, into (1) an incoming line having a first predetermined rate, and (2) second PCM bidirectional circuit mode digital lines. In a second state, the system switches said second channels and third and fourth bidirectional packet mode digital lines. The channels and second, third and fourth lines have a rate that is half of the first rate. The system comprises:

first means for demultiplexing the first incoming digital lines into the incoming first and second digital channels;

first means for multiplexing the outgoing first and second channels into the outgoing first digital lines;

second means for multiplexing said incoming first and second channels and the incoming second, third and fourth lines into an incoming digital multiplex having a third predetermined rate;

means receiving said incoming multiplex for bidirectionally switching said first channel of each first line with the first channel of a first line or with a second line and for bidirectionally switching said second channel of each first line with a fourth line and each third line with a fourth line; and second means for demultiplexing the outgoing digital multiplex having said third rate with results from the switching operations in said switching means, into said outgoing first and second channels and the outgoing second, third and fourth lines.

In accordance with the invention, the number of so-called subscriber first lines is greater than the number of fourth packet mode lines which are intended to connect the time division digital switching system to a packet switching network that has access to a medium for packet mode data transmission. This structure significantly reduces the cost of linking a subscriber to a packet transmission medium. The third packet mode lines are intended to connect the digital switching system to the outside networks, such as the switched telephone network or the telex network, by means of suitable matching, to afford the possibility of transmitting data along these outside networks.

The prime function of the system is to distinguish between the first channels intended for speech and the second channels intended for data packets in the first lines.

Once the system has detected an absence of flags which are normally emitted along a second channel (or along a third line) between the packets (or frames), it looks for a free fourth line so as to establish a bidirectional link between the corresponding subscriber (or outside network matching device) D.T.E. and the D.T.E. of the packet switching network connected to the fourth line. Conversely, the packet switching network transmits an order signal to the system according to the invention so as to establish a bidirectional link between a fourth line and a second channel (or between a fourth line and a third line) as soon as the control unit of the packet switching network has been, on the one hand, informed of the routing of a message to said second channel (or to said third line) and, on the other hand, has selected a free D.T.E. of the packet switching network. The system then performs true expansion and compression operations on the packet mode data along the fourth-lines-to-second-channels direction (or to-third-lines) and along the opposite direction respectively.

Moreover, the system emits flags along the second channels of the outgoing first lines and on the outgoing third and fourth lines. After each disconnection of a second channel or a third or fourth line, the flags are directed respectively toward the subscribers, the outside network matching device and the packet switching network, so as not to interrupt the normal packet exchange procedure.

BRIEF DESCRIPTION OF THE DRAWING

Other objects and features of the invention will be apparent from the following more particular description of preferred embodiments of the invention as illustrated in the accompanying drawings, in which:

FIG. 2 is a functional block diagram of a packet and voice switching individual equipment connected to a first double-channel line;

FIG. 3 is a functional block diagram of a packet switching individual equipment connected to a third line giving access to the outside network matching device; and FIG. 4 is a functional block diagram of a packet switching individual equipment connected to a fourth line giving access to the packet switching network, identical according to one characteristic of the invention to a voice switching individual equipment connected to a third line giving access to the outside network matching device.

DESCRIPTION OF THE PREFERRED EMBODIMENTS

Figure 1:
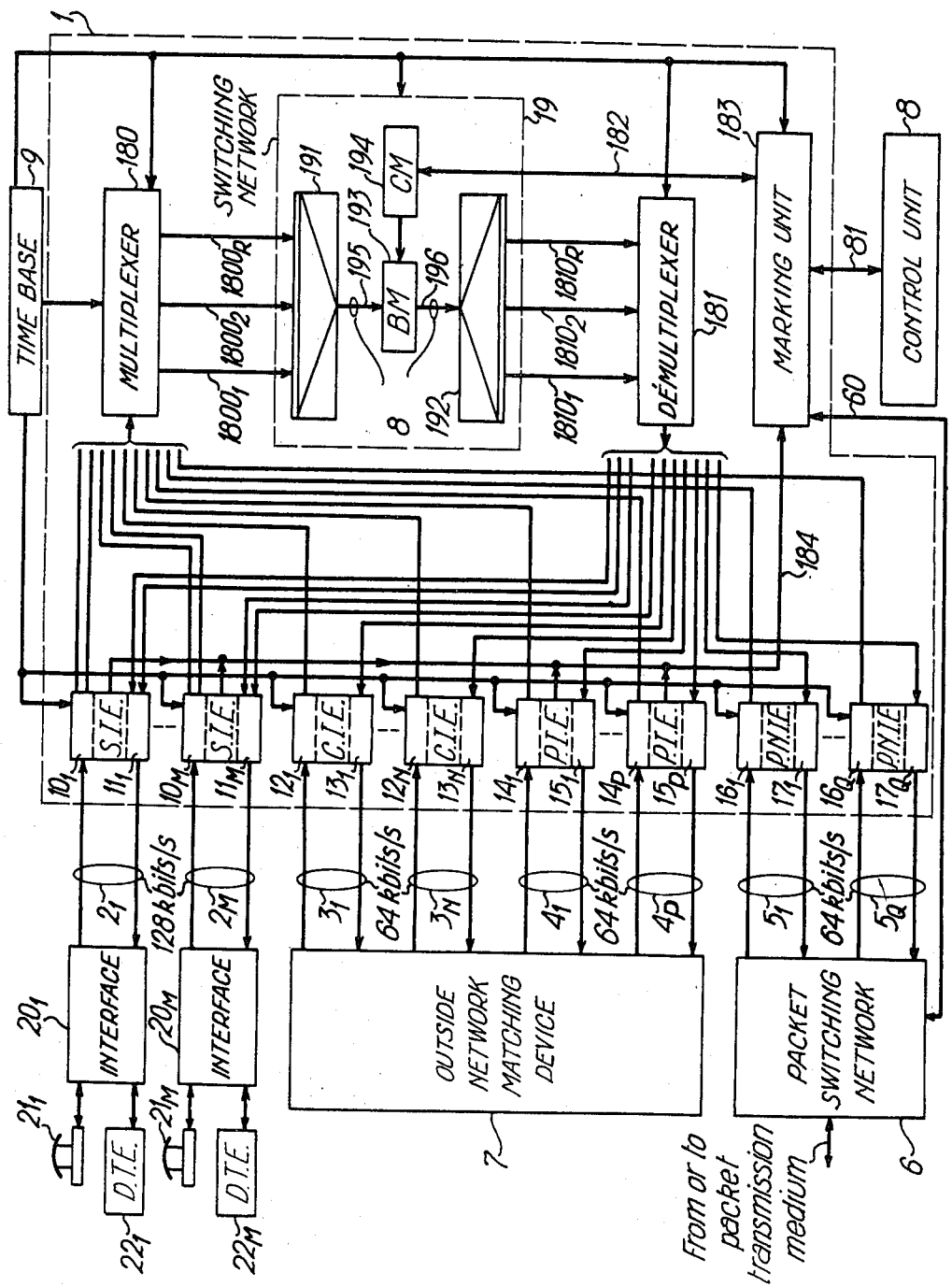
FIG. 1 is a schematic block-diagram of a time-division digital switching system according to the invention.

The nature of time-division switching system 1 embodying the invention is depicted in FIG. 1. The bidirectional digital connections to the system 1 are conventional and comprise for example lines including pairs of two types of symmetrical coaxial cables which operate in the duplex mode. The first type of cable includes first bidirectional digital lines $2_1$ to $2_M$ having a first predetermined binary rate equal to 128 kbit/s. The second type concerns second, third and fourth bidirectional digital lines $3_1$ to $3_N$, $4_1$ to $4_P$ and $5_1$ to $5_Q$ having a second binary rate equal to 64 kbit/s, i.e. half the first binary rate. The first lines $2_1$ to $2_M$ are subscriber's lines. They each convey a first digital channel in circuit mode $TI_c$ and a single digital channel in packet mode $TI_P$, each having a binary rate of 64 kbit/s. At the subscriber end, each first line $2_1$ to $2_M$ is connected, via interfaces $20_1$ to $20_M$ each of which comprises a multiplexer-demultiplexer, on the one hand, to the subscriber's telephone set $21_1$ to $21_M$, each of which is fitted with a single-channel PCM encoder/decoder and which is associated with the 64 kbit/s circuit mode $TI_c$ channel and, on the other hand, to subscriber data terminal equipments (D.T.E.) $22_1$ to $22_M$, each of which is ascribed to the 64 kbit/s packet mode $TI_p$ channel. The first circuit mode channel is of the PCM type and is suited for conventionally transmitting sampled speech in $TI_c$ octets. The second packet mode channel transmits packets in time intervals or octets $TI_p$. As known, each subscriber D.T.E. is linked to a plurality of terminals of the teletypewriter, telecopier, print-out, videophone or similar type, and transmits and receives messages ascribed to each terminal in split time. The messages transmitted by subscriber D.T.E. 22 are in the form of one or several informative packets which are routed via the switching system 1 to a packet switching network 6. After each packet heading has been analyzed, the switching network 6 reemits the latter packet to the second $TI_p$ channel of a first subscriber line 2, if the packet is intended for a subscriber D.T.E., or to a third line 4, if the packet is intended to be emitted over an outside network to distant subscribers, or lastly, to the packetized data transmission medium.

Consequently, propagating along each of a subscriber telephone lines $2_1$ to $2_M$ is, on the one hand, a conventional telephone digital channel in the so-called circuit mode at 64 kbit/s and, on the other hand, a digital channel in the packet mode at 64 kbit/s. The prime function of the switching system 1 is to distinguish between these two types of channel. The first channel $TI_c$ is switched to one of conventional 64 kbit/s voice PCM digital second lines $3_1$ to $3_N$ of the switched telephone network, thence to a distant subscriber's telephone set, or directly to the first circuit mode channel $TI_c$ of a local subscriber's line $2_1$ to $2_M$. The second channel $TI_p$ is switched via fourth 64 kbit/s digital lines $5_1$ to $5_Q$, operating in the packet mode, over to the packet switching network 6 which determines the various virtual circuits to be established for each of the messages propagating along the channel $TI_p$. These virtual circuits can be established via the digital switching system 1 and the packet switching network 6 either between two local subscribers or between a local subscriber and an outside network matching device 7. The device 7 is illustrated in FIG. 1 by a single block which is linked at 64 kbit/s to the second lines $3_1$ to $3_N$ and third lines $4_1$ to $4_p$ on the switching system side.

Before going in detail into the working and the structure of switching system 1 in detail, certain known features and definitions regarding packetized transmission are described. With this in mind, reference is made for further details to recommendation X.25 of the International Telegraph and Telephone Consultative Committee (C.C.I.T.T.) Volume VIII.2, Geneva, as regards the access procedure across a data processing terminal equipment.

Generally speaking, the standards for giving access to a packet transmission network as per recommendation X.25 define the three following levels:

(1) The packet level is related to the management of virtual circuits (multiplexing, setting up, freeing, zero setting, etc.); each virtual circuit is defined by correspondence established across a packetized switching network between two subscribers and bidirectionally transmits packets with sequential back-up; a virtual circuit is locally characterized over a link between two D.T.E. by a label on a packet heading which is referred to as a logic channel number.

(2) The frame level is related to the management of data exchanges between two D.T.E., between for example a subscriber D.T.E. and a D.T.E. of the packet switching network 6; this frame level uses the known High Level Data Link Control (HDLC) procedure specified by the International Organization for Standardization (I.S.O.); the frame level is a special case in HDLC procedure when the communication is of the point-to-point type.

(3) The physical level is related to the transmission features of the link between subscriber D.T.E. 22 and packet switching network 6, namely primarily those of the corresponding lines $2_1$ to $2_M$ and $5_1$ to $5_Q$ and of the digital switching system 1.

The present invention looks only at the latter two levels: the packet level is, indeed, only dealt with by the packet switching network 6. The system 1 does not take packet routing into consideration but concentrates solely on transmitting packets received from the channels $TI_p$ of the lines $2_1$ to $2_M$ or received from the lines $4_1$ to $4_p$ to the packet switching network 6, and conversely.

Furthermore, the system 1 which makes it possible to establish a "physical" link between a subscriber D.T.E. 22 (or the outside network matching device 7) and a D.T.E. of the switching network 6 only during the data packet transmission time, is transparent to the data it switches.

The frame level is monitered at each end of a link by the D.T.E. which is for instance one of a D.T.E.'s $22_1$ to $22_M$ for one of lines $2_1$ to $2_M$, a D.T.E. (not shown) of the matching device 7 for one of lines $4_1$ to $4_p$ or a D.T.E. of the packet switching network 6 for one of lines $5_1$ to $5_Q$.

In compliance with the standardized terminology set forth in C.C.I.T.T. recommendation X.25, "frame" (designated hereabove by packet) will henceforth refer to any sequence of data binary elements which is transmitted between two particular octets termed "flags" F by one D.T.E. to another D.T.E. via system 1. This sequence comprises at least four octets, i.e. 32 bits. In this case, the sequence only concerns the frame level and does not contain any packets. The sequence can comprise a maximum of 68 octets, i.e. 544 bits in which case it contains a data packet of 68−4=64 octets. A D.T.E. ignores any frame with an octet number is less than 4 or greater than 68. Consequently, the system 1 switches frames with contents it ignores.

Between two successively transmitted frames, flags F are interposed. Each flag F consists of one 0 followed by six contiguous 1s and one 0, i.e., the octet F=0 1 1 1 1 1 1 0.

One characteristic of the invention, described at a later stage, is that each frame is preceded by two flags and followed by two flags.

To ensure correct detection at the start and end of a frame, the frame must not contain any flag F. With this in mind, a D.T.E., when transmitting, inserts a 0 bit after any sequence of five contiguous 1 bits in the frame. The D.T.E., when receiving, examines the frame content and discounts any 0 bit which directly follows five contiguous 1 bits.

It will be recalled that during the transmission of a control frame CF from the emitting part of a subscriber D.T.E. 22, the matching device 7 or the packet switching network 6 calls for along the transmission direction the emission of a so-called response frame RF by the emitting part of the other D.T.E. which has detected a frame corresponding to a control frame (data frame, information frame such as asynchronous response mode setting or established link disconnection). The response frame RF can, for instance, be the receive ready supervisory frame RR further to the detection of a control frame, or a receive not ready supervisory frame RNR corresponding to a later control frame processing, or a reject supervisory frame RES further to errors being detected in the sequencing of the received frames. As a result, any data exchange between two subscriber D.T.E. (or matching device 7) and packet switchiing network 6 gives rise to a first emission of a so-called control frame CF from the first to the second D.T.E. and then, after detection and complete reception of said frame in the second D.T.E., to a sequencing check on this frame followed by the emission of a so-called response frame RF from the second to the first D.T.E. Of course, the second D.T.E. can start emitting a response signal during reception of a second control frame, in which case the link established by the switching system in relation to the first exchange is maintained for the second exchange.

The switching system 1 sets up a link between a subscriber D.T.E. and the packet switching network 6 in response to detection by subscriber D.T.E. 22 of a control frame CF opening, i.e. initial flag and disconnects this link upon orders from network 6, via a bus 60, as soon as the switching network 6 has finished emitting the response frame RF. In the other exchange case, the packet switching network 6 gives the order, via the bus 60, to the system 1 to establish a link available for transmitting a control frame CF from the switching network 6 to a subscriber D.T.E. 22 and also gives the order, as per the first exchange, to disconnect this link once the switching network 6 has disconnected and received a response frame RF.

The units making up system 1 that are specific to the invention are primarily the emitting and receiving parts of subscriber individual equipments (S.I.E.) $10_1$ to $10_M$ and $11_1$ to $11_M$ which are connected to subscriber lines $2_1$ to $2_M$, the emitting and receiving parts of circuit-switching individual equipment (C.I.E.) $12_1$ to $12_N$ and $13_1$ to $13_N$ which are connected to the outside network matching device 7, the emitting and receiving parts of the packet-switching individual equipments (P.I.E.) $14_1$ to $14_p$ and $15_1$ to $15_p$, both of which are connected to 64 kbit/s third packet mode lines $4_1$ to $4_p$ conveying the frames between the system 1 and the outside network matching device 7, the emitting and receiving parts of the packet-switching individual equipments (P.N.I.E.) $16_1$ to $16_Q$ and $17_1$ to $17_Q$ both of which are connected to 64 kbit/s fourth packet mode lines $5_1$ to $5_Q$ conveying the frames between the system 1 and the packet switching network 6, a multiplexer 180 and a demultiplexer 181. Moreover, time-division switching system 1 comprises a known switching network 19 for the switching of 64 kbit/s simple lines or channels. The switching network 19 comprises a multiplexer 191 which multiplexes digital channels $1800_1$ to $1800_R$ outgoing from the multiplexer 180, a demultiplexer 192 performing the inverse operation and transmitting digital channels $1810_1$ to $1810_R$ to the multiplexer 181, a buffer memory (BM) 193 and a control memory (CM) 194. The control memory 194 receives the connection establishing or freeing orders delivered by a marking unit 183 via a bidirectional link 182.

Incoming lines 2, 3, 4 and 5 at 128 kbit/s and 64 kbit/s rate are multiplexed in the multiplexer 180 into a certain number of higher bit-rate digital channels $1800_1$ to $1800_R$. The digital channels $1810_1$ to $1810_R$ which are derived from the switching network 19 and have the same bit-rate as that of digital channels $1800_1$ to $1800_R$, are demultiplexed in the demultiplexer 181 into the outgoing lines 2, 3, 4 and 5.

The system is, for instance, coupled up to (M=110) 128 kbit/s subscriber lines $2_1$ to $2_{110}$, (N=22) 64 kbit/s lines $3_1$ to $3_{22}$, (P=6) 64 kbit/s lines $4_1$ to $4_6$ and (Q=8) 64 kbit/s lines $5_1$ to $5_8$. The multiplexer 180 thus multiplexes 2M+N+P=256 digital channels of 64 kbit/s transmitted by the receiving parts of individual equipment items 10, 12, 14 and 16. Multiplexer comprises R=8 multiplexing modules, each of which multiplexes 32 64 kbit/s channels into one digital channel 1800 of 2048 kbit/s. Multiplexing takes place in each module of the multiplexer 180 in groups of 8 consecutive bits delivered by each incoming 64 kbit/s channel. The octet thus formed is series transmitted in a time interval of 3.9 μs along the 2048 kbit/s digital channel. R=8 digital channels $1800_1$ to $1800_8$ derived from the multiplexer 180 are therefore connected to the switching network 19.

The operating principle of switching network 19 is known in the prior art. A particularly economical embodiment thereof is described in U.S. patent application Ser. No. 054,238 filed on July 2, 1979 and entitled "Multiplex time-division switching unit of the "time-time" type".

A conventional, but less optimized, embodiment is illustrated in FIG. 1. A series-to-parallel converter and a multiplexer 191 supplies octets delivered in series along digital channels $1800_1$ to $1800_R$ in parallel to 8 wires and multiplexes these parallel octets into a supermultiplex 195 having 8 wires, on each of which is derived a digital binary rate equal to 2048 kbit/s. The buffer memory 193 comprises, according to the chosen example, 32×R=256 words of 8 bits. The control memory 194 also comprises 256 8-bit words. In FIG. 1, demultiplexer 192 is a parallel-series converter for conducting octets derived from the supermultiplex 196, which has 8 wires leaving buffer memory 193, into a series data stream; demultiplexer 192 also includes a demultiplexer which demultiplexes the derived octets in R=8 digital channels $1810_1$ to $1810_R$.

Outgoing digital channels $1810_1$ to $1810_R$ of digital switching network 19 are connected to demultiplexer 181. The latter comprises R=8 demultiplexing modules, each of which demultiplexes an outgoing digital channel 1810 to derive 32 64 kbit/s channels connected to the emitting parts 11, 13, 15 and 17 of the individual equipments.

In accordance with the invention, the integer Q is always very much less than M+P since there is a very small probability of requesting a subscriber line each time a frame is transmitted. As a result, there is an expansion of frame 5 towards frames 2 and 4 and compression of frames 2 and 4 towards frame 5.

The control memory 194 of the switching network 19 is reset by the marking unit 183 of the system 1. The unit 183 receives from each receiving part 10, 12, 14, 16 the transmitted data and the corresponding line address via a particular bus 184. Bus 182 supplies via the link 182 to the control memory 194, write-in control signals which enable data corresponding to an address of an incoming line 3, 4, 5 or an incoming channel ($TI_p$ or $TI_c$) of an incoming line 2 to be written-in at an address of the control memory 194 identifying an outgoing line 3, 4, 5 or an outgoing channel ($TI_p$ or $TI_c$) of an outgoing line 2.

Following this writing effected by the marking unit 183 in the control memory 194, also referred to as "connection marking", the control memory 194 periodically supplies, every 125 μs, the buffer memory 193 with the address corresponding to an incoming line, and this being a periodic instant corresponding to an outgoing line. The buffer memory 193 thus periodically derives the data octet written beforehand at the address indicated by the control memory. This data transfer takes place cyclically every 125 μs for each octet to be transmitted.

According to a known feature of the prior art, the 8-wire supermultiplexers 195 and 196 have 256 time intervals which correspond to the 256 lines and are split, in the afore-mentioned example, into 220 channels along lines 2 (i.e. 110 mode circuit channels $TI_c$ and 110 mode packet channels $TI_p$), N=22 lines $3_1$ to $3_{22}$, P=6 lines $4_1$ to $4_6$ and Q=8 lines $5_1$ to $5_8$.

In this way, according to the invention, the same switching network 19 makes it possible, depending on requirements, to establish (1) connections between channels $TI_c$ of the lines 2, (2) connections between a channel $TI_c$ of a line 2 and a line 3 as regards the voice-routing connections, (3) connections between a channel $TI_p$ of a line 2 and a line 5 and (4) connections between a line 4 and a line 5 as regards the data (or packet) frame-routing connections.

The marking unit 183 detects whether or not lines $5_1$ to $5_Q$ are occupied, either by means of a special internal memory that it resets when connections are established or freed, or by reading the control memory 194 by means of the bidirectional link 182. Thus when the beginning of a frame (indicated by an absence of flags) is detected along the channel $TI_p$ of a line 2 by the receiving part 10 of an S.I.E. or along a line 4 by receiving part 14 of a P.I.E., marking unit 183 is advised thereof by the bus 184 over which the S.I.E. receiving part 10 or the P.I.E. receiving part 14 indicates the line in question. The marking unit 183 searches for a free line 5. If a line 5 is available, the unit 183 orders the marking in the control memory 194 thereby establishing a connection between line 2 or 4, over which a frame emission has started, and the selected available line 5 selected.

The marking unit 183 can also receive, via a link 81, connection requests delivered by a system control unit 8, when connections have to be established between two channels $TI_c$ of lines 2 or between a channel $TI_c$ of a line 2 and a line 3. Finally, the marking unit 183 can receive connection requests via the link 60 from the packet switching network 6 when connections have to be established between a line 5 and a line 4 or a channel $TI_p$ of a line 2. Each of these connections requests, controlled by the packet switching network 6, precedes the emission by the latter of a frame along a line 5.

A time base circuit 9 supplies all the clock signals required for the system 1 to operate smoothly.

The various types of switching are considered with in detail as the descriptions of a S.I.E. and a P.N.I.E. progress.

A circuit diagram of subscriber individual equipment S.I.E. is illustrated in FIG. 2. Emitting part 10 of equipment S.I.E. comprises a binary synchronizing and shaping circuit 100 for the digits of the $TI_p$ and $TI_c$ channels delivered by the corresponding line 2, first demultiplexing means in the form of a demultiplexer 102 which demultiplexes the two $TI_p$ and $TI_c$ channels, a flag detector 103 and a call register 104. The reception part 11 of equipment S.I.E. comprises first multiplexing means in the form of a multiplexer 111 and a reshaping circuit 112.

The synchronizing and shaping circuit 100 converts the received line code digital signal into binary code digits and synchronizes the received bits by means of the clock signals delivered by the time base circuit 9. Contrary to this, the reshaping circuit 112 provides emission synchronization for the bits to be emitted by means of clock signals delivered by time base 9 and converts the binary coded digits processed in the system 1 into the line code digits. The time base circuit 9 transmits in particular the 128 kHz and 8 kHz clock signals to the multiplexer 102 and the demultiplexer 111.

The multiplexer 102 comprises a shift register 1020 having 16 binary stages into which data are written at the 128 kHz frequency. This register 1020 acts as a series-to-parallel converter that is read out at the 8 kHz frequency. The contents of the last eight stages represent an octet transmitted from the circuit mode channel $TI_c$ to a buffer register 1021.

In conjunction with the preceding transfer, the contents of the first eight stages of the register 1020 are written in a second buffer register 1022 and delivered to the flag detector 103. This detector compares each received binary word with a previously stored word $F = 0\ 1\ 1\ 1\ 1\ 1\ 1\ 0$. Following a sequence of contiguous flags, once the detector 103 detects the absence of a flag, i.e. the start of a control frame CF, it delivers a transmit authorization signal to the call register 104. The latter is synchronized by time base 9 and supplies along the bus 184 a switching request intended for the marking unit 183, whilst indicating the address of the line 2. The marking unit 183 searches for a free line amongst the Q lines $5_1$ to $5_Q$. To this end, it examines either the contents of a "free" or "occupied" status internal memory for lines $5_1$ to $5_Q$, or the contents of the control memory 194 by reading along the link 182. If there is no free line 5, the unit 183 does not connect the line 2 to a line 5, which is no way troublesome for the reason that since the D.T.E. 22 in question has emitted a frame, it can repeat the re-emission ten or so times until it receives a response frame RF delivered by the packet switching network 6. In the opposite case, the unit 183 sends a double marking order to the control memory 194 so as to establish a bidirectional connection in switching network 19 between the line 2 and the selected line 5 (2 to 5 and 5 to 2).

A bidirectional link is thus established through the switching network of the system 1 between the S.I.E. 10-11 delivering a frame and the P.N.I.E. 16-17 retransmitting it to the packet switching network 6.

It will be noted that, after the emission of the first control frame CF, the D.T.E. 22 can emit other frames in such a way that each frame is detected by the corresponding connected D.T.E. of the packet switching network 6 before the emission of a response frame RF has finished. The signal emitted by the flag detector 103 which follows the absence of flags and which corresponds to another control or response frame delivered from the subscriber D.T.E. of the line 2, has no effect in the marking unit 183 since the connection has already been established for transmitting a control frame CF.

Once the frame exchange or exchanges have finished, the packet switching network 6 gives the marking unit 183 the order to disconnect the lines 2 and 5, via the bus 60. This order follows the detection of an RF emitted from the D.T.E. 22 or the emission from the switching network 6 of an RF. The unit 183 supplies an order to control memory 194 to cancel the addresses corresponding to the previously established link. This cancellation order consists, in fact, of making unidirectional connections in switching network 19 between the previously connected outgoing channels of lines 2 ($TI_p$) and 5, and a particular line 3 which continually supplies to system 1 a particular code identical to the flag code $0\ 1\ 1\ 1\ 1\ 1\ 1\ 0$. In this way, after each disconnection or, more generally, for channels $TI_p$ and unconnected lines 4 and 5, the switching network 19 continually transmits flags from a particular incoming line 3 to outgoing lines 4, 5 and the outgoing channels $TI_p$ of outgoing lines 2 of the system 1.

However, when the disconnection occurs, which is only after the frame has been fully received for the receiving D.T.E., thus followed by flags emitted from the emitting D.T.E., these flags are not necessarily taken up in octets with the time base 9 which synchronizes the switching network 19, further to the insertion of one or several 0 bits in the contents of each emitted frame. It therefore follows that the receiving D.T.E. detects a discontinuity in the flag reception after receiving a frame. As this discontinuity is less than 8 bits, the D.T.E. ignores it since the discontinuity is much less than a valid frame which must contain at least 4 octets, namely 32 bits.

Insofar as the subscriber D.T.E. 22 or the matching device 7 D.T.E. emits bits without synchronization with the time base 9, the receiving D.T.E. of the switching network 6 observes a discontinuity in received flag sequence whilst the switching network 19 is establishing the connection. This discontinuity must occur at least two octets before the opening of the frame. This is why the flag detection in the S.I.E. must take place at least two octets before the first octet if the data frame is transmitted to the switching network 19. According to the invention, this is achieved by a delay circuit 1023 which is connected to respond to the output of the buffer register 1022 of the multiplexer 102 in the S.I.E. receiving part 10. The delay circuit 1023 is a straightforward shift register having at least 16 binary stages.

As can be seen on FIG. 2, the multiplexer 111 comprises two buffer registers 1111 and 1112 which receive the 64 kbit/s channels $TI_p$ and $TI_c$ in parallel from the demultiplexer 181, and a shift register 1110 for retransmitting the multiplexed and channels $TI_p$ and $TI_c$ to the line 2 via the reshaping circuit 112. The multiplexer 111 performs the inverse function of demultiplexer 102.

FIG. 3 is a circuit diagram of a packet-switching individual equipment P.I.E. 14-15. Equipment P.I.E. 14-15 acts with regard to the packet switching network 6 in an analogous way to an S.I.E. However, the structure is simpler since there of P.I.E. 14-15 no multiplexing and demultiplexing of component channels. Thus, through comparison with FIG. 2, the receiving part 14 includes a synchronizing and shaping circuit 140, a delay circuit 142, a flag detector 143 and a call register 144. The output of the circuit 140 is connected directly to the digital inputs of the delay circuit 142 and detector 143. Apart from the latter connection, all the others are respectively identical to those described for receiving part 10 in FIG. 2.

The synchronizing and shaping circuit 140 receives the frames and flags transmitted by the corresponding D.T.E. of the matching device 7, via a line 4. The 64 kHz clock signal is provided by time base 9. The flag detector 143 functions according to the same principle as the detector 103 illustrated in FIG. 2. Once detector 143 has detected the absence of a flag, it delivers an emission authorization signal to the call register 144 which, synchronized by time base 9, emits a switching request on the bus 184 intended for the marking unit 183 the request indicates the address of the line 4.

The delay circuit 142 is identical to register 1023 (FIG. 2) and inserts at least a 16 bit delay in the received frame before sending it into the multiplexer 180 such that the connection of the line 4 and a free line 5 is established by the switching network 19, whilst the receiving part 14 carries on emitting flags preceding the frame which has just been detected.

The emitting part 15 is much simplified with respect to the emitting part 11 (FIG. 2). It merely comprises a reshaping circuit 152 which is synchronized by the time base 9.

FIG. 4 is a circuit diagram of a packet switching individual equipment P.N.I.E. 16–17 which is connected through a line 5 to the packet switching network 6. The receiving part 16 comprises only a synchronizing and shaping circuit 160 and the emitting part 17 comprises only a reshaping circuit 172. The equipment P.N.I.E. is identical to a circuit switching equipment C.I.E. which is connected via a line 3 to the outside network matching device 7.

Indeed, as already pointed out, the packet switching network 6, prior to any frame being transmitted along a line 5, requests the marking unit 183, via the bus 60, to carry out a connection performed by switching network 19 between said line 5 and a destination line 4 or a destination channel $TI_p$ on a line 2. A P.N.I.E. connected to the packet switching network 6 does not need to detect a flag absence since the connection is established beforehand. After frame exchange has occured, the switching network 6 asks the marking unit 183 for a disconnection, along the bus 60. The unit 183 delivers the disconnection order to the switching network 19 which therefore connects outgoing lines with a line 3 continually emitting the flag code 0 1 1 1 1 1 1 0, as previously described.

The disconnection can cause discontinuity in the transmission of the flags received in the receiving part of the two D.T.E.'s previously interconnected through the system 1. This discontinuity is ignored by both D.T.E.'s since it implies a frame less than an octet and any frame less than 4 octets is systematically ignored by both D.T.E.

Consequently, by adding very straightforward specific individual equipment to a digital switching network, the system 1 embodying the invention makes it possible to concentrate packet-switched data emitted from far-flung subscriber terminals to a multi-process packet switching network which, although "virtually" connected to each of them on a permanent basis, is in fact only really connected thereto during the useful data transmission times.

What we claim is:

1. A time division digital switching system for switching, on the one hand, between first PCM circuit mode digital channels and second PCM bidirectional circuit mode digital lines, each of the first channels being multiplexed with a second packet mode digital channel into a first bidirectional line having a first predetermined rate, as well as fourth bidirectional packet mode digital lines, said first and second channels and said second, third and fourth lines having a second rate half said first rate, each of the first, second, third and fourth channels including incoming and outgoing channels, the first bidirectional line including first incoming digital and first second, third and fourth outgoing digital lines, said system comprising:

first means for demultiplexing the incoming first digital lines into the incoming first and second digital channels;

first means for multiplexing the outgoing first and second channels into the outgoing first digital lines;

second means for multiplexing said incoming first and second channels and the incoming second, third and fourth lines into an incoming digital multiplex having a third predetermined rate;

means receiving said incoming multiplex for bidirectionally switching said first channel of each first line with the first channel of a first line or with a second line and for bidirectionally switching the second channel of each first line with a fourth line to derive an outgoing digital multiplex; and second means for demultiplexing the outgoing digital multiplex having said third rate which results from the switching operations in said means for switching, into said outgoing first and second channels and the outgoing second, third and fourth lines.

2. A time division digital switching system according to claim 1 wherein said first demultiplexing means comprises means for detecting flags interposed between two packets convoyed in said second channel of each incoming first line in said second multiplexing means and means for addressing said switching means so as to bidirectionally switch said second channel with a free fourth packet mode line in response to a flag absence signal delivered from said flag detecting means.

3. A time division digital switching system according to claim 2 comprising means connected to the corresponding inputs of said second means for multiplexing for delaying the packets convoyed in said second channels for a period equal to at least two flags.

4. A time division digital switching system according to claim 1 comprising means for detecting the flags interposed between two packets convoyed in each incoming third line in said second means for multiplexing and means for addressing said switching means so as to bidirectionally switch said third line with a free fourth packet mode line in response to a flag absence signal delivered from said flag detecting means.

5. A time division digital switching system according to claim 4 comprising means connected to the corresponding inputs of said second means for multiplexing for delaying the packets convoyed in said third lines for a period equal to at least two flags.

6. A time division digital switching system according to claim 1 wherein said means for switching comprises means for establishing or breaking a bidirectional link from a fourth line to the second channel of a predetermined first line or from a fourth line to a third line in response to a bidirectional connection or disconnection request signal which contains the address of said predetermined first or third line and which is emitted by a packet switching network to which said fourth lines are connected.

7. A time division digital switching system according to claim 6 wherein, after a bidirectional disconnection between a second channel of a first line and a fourth line or after a bidirectional disconnection between a third line and a fourth line, said means for switching unidirectionally links the outgoing second channel or the outgoing third line and the outgoing fourth line to a predetermined incoming second line permanently delivering flags.

8. A time division digital switching system according to claim 1 in which said first lines are subscriber telephone digital lines, said second lines are PCM circuit mode digital lines connected to means for matching said system to outside switching networks, said third lines are packet mode digital lines connected to said matching means and said fourth lines are packet mode digital lines connected to a packet switching network.

9. A time division digital switching system according to claim 1 or 8 wherein the number of said first and third lines is greater than the number of said fourth lines.

10. A time division digital switching system according to claim 9 wherein the number of said first lines is greater than the number of said second lines.

11. A time division digital switching system according to claim 1 wherein said predetermined first rate is equal to 128 kbit/s.